July 26, 1949.  N. E. GEE  2,477,175
FLEXIBLE DRIVE PINION

Filed Sept. 15, 1944  2 Sheets-Sheet 1

Inventor
Norman E. Gee

July 26, 1949.　　　　　N. E. GEE　　　　2,477,175
FLEXIBLE DRIVE PINION
Filed Sept. 15, 1944　　　　　　　　　　　2 Sheets-Sheet 2

Inventor
Norman E. Gee

Patented July 26, 1949

2,477,175

UNITED STATES PATENT OFFICE 2,477,175

FLEXIBLE DRIVE PINION

Norman E. Gee, Narberth, Pa.

Application September 15, 1944, Serial No. 554,278

3 Claims. (Cl. 64—27)

This invention relates to an improved driving pinion or gear construction, such for example as used on electric locomotives, and has primarily in view a gear ring or rim mounted for angular flexibility on and about a gear center in such manner to permit the entire gear to rotate in either direction with the same degree of angular flexibility.

Another object of the invention is to provide a flexible drive pinion which is so constructed as to obviate the use of metal springs interposed between the gear center and gear rim.

A further object is to provide a gear rim flexibly mounted on a gear center in such manner as to restrain the axial or lateral movement of the gear rim with reference to the gear center.

A still further object is to provide ample sliding surface area between the gear center and the gear rim to reduce wear to a minimum, thus assisting in maintaining the pitch line of the gear rim in its proper relation with the gear center.

With the above and other objects in view which will become apparent as the nature of the invention is better understood the same consists in the novel construction, combination and arrangement of parts hereinafter more fully pointed out, illustrated, and claimed.

In the accompanying drawings:

Figure 3 further indicates the position of the key that positions the gear rim on the gear center such as to prevent relative axial or lateral movement therebetween.

Similar reference numerals refer to similar parts throughout the several figures of the drawings.

The invention includes in its organization a gear center 10, having the standard taper 11, adapted to be fitted while hot, onto the tapered portion of the motor armature shaft of the driving motor of an electric locomotive. In other words, the gear center is shrunk on the shaft. The said tapered portion is also provided with the usual threaded socket 12 for receiving a portion of the pinion puller for removing the gear center from the armature shaft when required.

Figure 1:
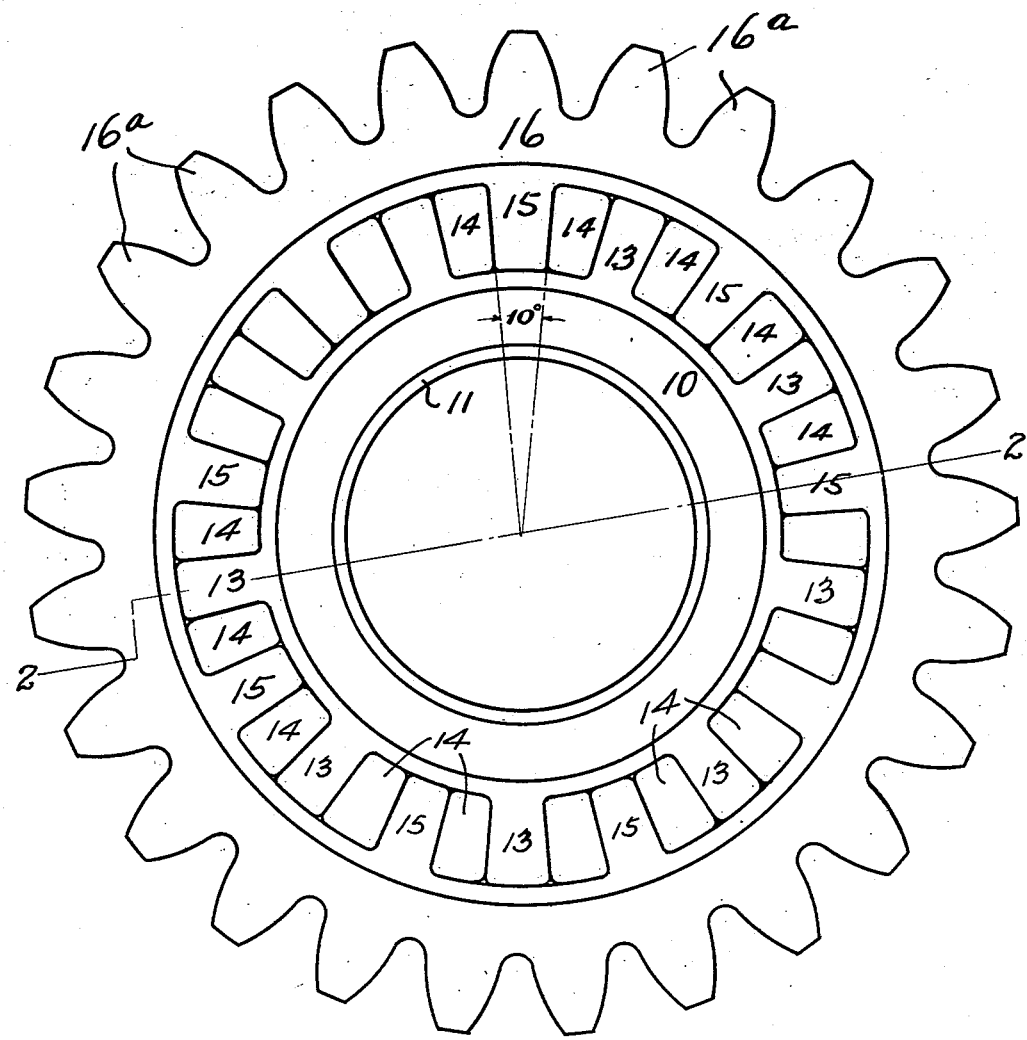
Figure 1 is a rear elevation of a flexible pinion as applied to the armature shaft of an electric locomotive, the cover ring for the lugs and rubber inserts being omitted.

The gear center is further provided with a plurality of radially outwardly projecting lugs 13, which are flanked on either side by the rubber or equivalent drive units or inserts 14. The said drive units 14 are in turn, engaged on their outermost faces by the radially inwardly projecting lugs 15 on the gear rim 16, having the gear teeth 16a. In other words, the rubber drive units 14 are interposed in the spaces or chambers between the oppositely projecting lugs 13 and 15 as clearly illustrated in Figure 1 of the drawings, since the motor which carries the pinion delivers power from the gear center to the gear rim.

In laying out the pinion structure the number of lugs used are calculated on the basis of the number of degrees in a complete circle. For example, the pinion illustrated includes a gear center 10 having nine driving lugs and a like number of lugs on the gear rim 16, thus giving us a total of eighteen driving lugs each of which receives power from either side through the rubber blocks or inserts 14. Each of these inserts 14 and lugs 13 subtend an arc at the base of 10°. By way of further illustration, in a pinion of larger diameter, fifteen lugs may be provided on the gear center and a like number on the gear rim. In this case, the inserts and lugs 13 would subtend an arc of 6° at their base. This arrangement gives a symmetrical gear, equally operative in either a forward or reverse direction.

With further reference to the lugs 13 and 15, it is pointed out that the outer ends of the lugs 13 bear directly against the rim between lugs 15. And, likewise the inner ends of the lugs 15, between the lugs 13, bear directly against the gear center 10. Thus, in effect the gear center 10 and rim 16 are held in relatively fixed concentric relation whereby there is only sufficient play or tolerance to permit the inner ends of 15 and the outer ends of 13 to slide on their companion surfaces and not move radially. The reason for this arrangement is that when two gears on the order of 10 and 16 rotate, one driven by the other, the tendency is for the gears to crowd apart radially and thus the pitch lines of the gears tend to separate. However, this is avoided by making the lugs 13 and the lugs 15 of sufficient vertical depth so that their inner ends or heads have a sliding bearing engagement with the body of the element opposite that which carries them.

Figure 4:
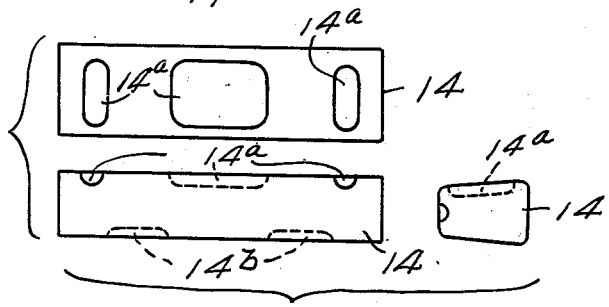
Figure 4 shows side, top plan, and end elevations of the rubber driving units which are positioned between the lugs on the gear center and the gear rim.

The rubber, or rubber compound, insert 14 shown in Figure 4 of the drawings is preferably made with a plurality of depressions 14a—14b which are in staggered relation on opposite sides to avoid shearing effect when the unit is subjected to load due to motor-torque.

Figure 2:
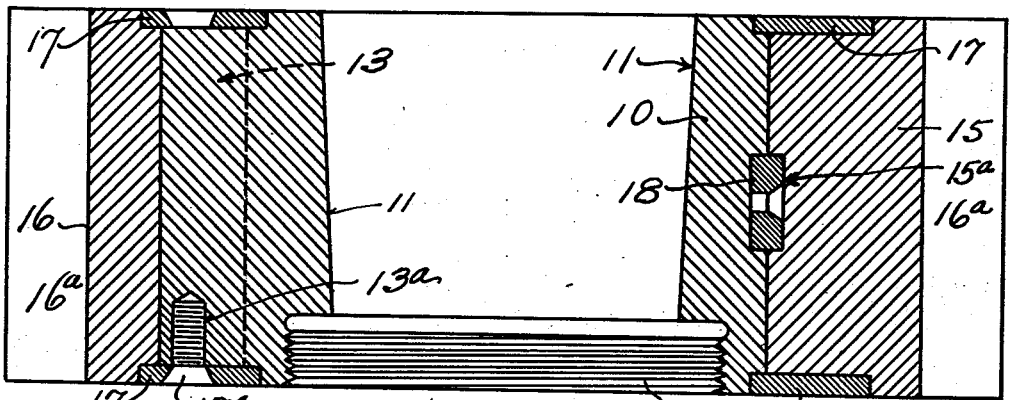
Figure 2 shows a cross sectional view taken on the line 2—2 of Figure 1 of the drawings, but looking from the rear of Figure 1, that is from the face of the pinion.
Figure 3:
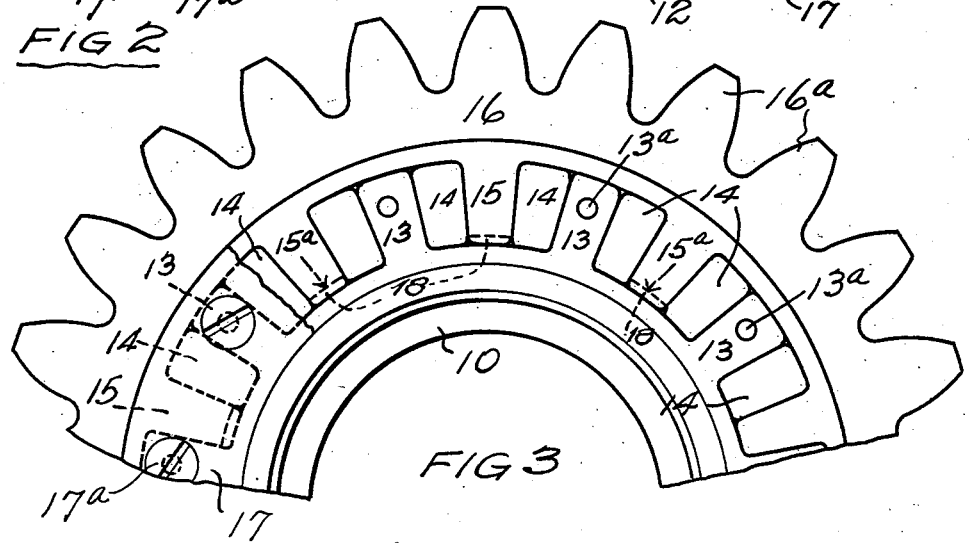
Figure 3 is a fragmentary elevation of the flexible pinion shown in Figure 1, showing the machine screw openings in the gear center for holding the side plates or rings in position as illustrated in Figure 2 of the drawings.

In addition to the depressions in the driving insert, the length of the insert is such that ample room is left for the drive unit to elongate without being restricted by the assembly rings or cover plates 17 positioned on either side of the gear. These rings or plates span the joint between the gear center 10 and the outer toothed driving gear ring 16 and are seated in matching recesses in each of said elements as will be seen in Figure 2. Screws 17a entering the threaded sockets 13a hold front ring 17 in place, while the rear ring is preferably welded to the lugs 13. The rings 17—17 also provide additional wear surface between the gear center 10 and rim 16.

In addition to the rings 17 positioned on either side of the gear center 10 which serve to prevent the gear rim from moving laterally on the gear center, as well as to keep the drive units in position I provide central locking keys 18, which are positioned and held secure on the gear center, while the inwardly projecting lugs 15 on the rim 16 are each slotted out as at 15a to receive the key when the gear rim is in position with gear center. That is to say, the bottoms of the valleys between the outwardly projecting lugs 13 are provided with short circumferential keys 18 which are preferably screwed in place medially of each pair of lugs, and the ends of the inwardly projecting lugs 15 are provided with circumferential slots 15 so that the gear center 10 and outer gear ring 16 may be assembled in co-planar relation by first axially sliding lugs 15 between lugs 13 out of line with the keys 18, and then rotating 10 relative to 16 to bring the keys 18 into the slots 15a. The rubber inserts 14 may then be driven or forced into place and the ring-like plates 17 applied as heretofore described.

From the foregoing, it will be apparent that the present invention provides a driving pinion including the so-called gear center 10 and the outer rim 16, said center having spaced radially outwardly projecting lugs and said rim having spaced radially inwardly projecting lugs, and also provided at its outer periphery with a plurality of driving teeth. The gear center and rim are interlocked to resist axial movement when assembled, and suitable non-metallic inserts 14, for example, are placed between the lugs of the gear center and rim, thereby to cushion both the driving and braking effort from the gear center toward the rim, or vice versa.

Without further description, it is believed that the advantages of the invention will be readily apparent to those skilled in the art, and it will of course be understood that changes may be resorted to within the scope of the appended claims.

I claim:

1. A flexible drive gear, including a gear center having a plurality of radially disposed equally spaced outwardly projecting lugs on its circumference, a gear rim having a like number of inwardly projecting lugs positioned midway the lugs on the gear center, said lugs respectively on the gear center and rim being angularly spaced relative to each other to provide chambers at each side of each lug to receive a resilient insert, locking keys secured centrally of the bottoms of the valleys between the lugs of the gear center and slots arranged circumferentially of the inner ends of the lugs on the rim, said gear center and rim being locked against axial displacement by placing them in co-planar relation with the lugs on the rim out of registry with the keys on the gear center and then rotating the gear center relative to the rim to bring said slots over the keys, and non-metallic resilient inserts fitted in the aforesaid chambers between the lugs of the rim and the lugs of the gear center to engage the adjacent faces of the lugs and thereby provide cushioned power transmitting faces between the lugs and also holding the slots and keys of the respective lugs in locked position to prevent accidental axial displacement of the gear center and rim.

2. A flexible drive gear, including, in combination, a gear center, a plurality of radially disposed lugs on the outer circumference of the gear center, a gear rim, a plurality of inwardly projecting lugs on the gear rim positioned mid-way of the lugs on the gear center, cooperating means respectively on the bottoms of the valleys between the lugs on the gear center, and the peaks of the lugs on the gear rim for interlocking the gear center and gear rim against axial displacement, and resilient inserts fitted between adjacent faces of the lugs on the gear center and gear rim.

3. A flexible drive gear, including, in combination, a gear center, a plurality of radially disposed lugs on the outer circumference of the gear center, a gear rim, a plurality of inwardly projecting lugs on the gear rim positioned mid-way of the lugs on the gear center, cooperating means respectively on the bottoms of the valleys between the lugs on the gear center, and the peaks of the lugs on the gear rim for interlocking the gear center and gear rim against axial displacement, resilient inserts fitted between adjacent faces of the lugs on the gear center and gear rim, and means for preventing endwise displacement of the resilient inserts from between the lugs.

NORMAN E. GEE.

REFERENCES CITED

The following references are of record in the file of this patent:

UNITED STATES PATENTS

| Number | Name | Date |
| --- | --- | --- |
| 534,676 | Sperry | Feb. 26, 1895 |
| 1,071,819 | Sundh | Feb. 20, 1912 |
| 1,815,894 | Baker | July 28, 1931 |
| 2,009,059 | Brennan et al. | July 23, 1935 |

FOREIGN PATENTS

| Number | Country | Date |
| --- | --- | --- |
| 2,026 | Great Britain | 1900 |
| 5,442 | Great Britain | 1894 |